(12) United States Patent     (10) Patent No.:   US 12,683,668 B2

Chi et al.     (45) Date of Patent:    Jul. 14, 2026

(54) PRECODING INFORMATION FEEDBACK METHOD AND DEVICE

(71) Applicant: Beijing Xiaomi Mobile Software Co., Ltd., Beijing (CN)

(72) Inventors: Liangang Chi, Beijing (CN); Gaoming Duan, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 133 days.

(21) Appl. No.: 18/713,402

(22) PCT Filed: Nov. 26, 2021

(86) PCT No.: PCT/CN2021/133673

§ 371 (c)(1),
(2) Date: May 24, 2024

(87) PCT Pub. No.: WO2023/092494

PCT Pub. Date: Jun. 1, 2023

(65) Prior Publication Data

US 2025/0023615 A1     Jan. 16, 2025

(51) Int. Cl.
    *H04B 7/06*       (2006.01)

(52) U.S. Cl.
    CPC ......... *H04B 7/0639* (2013.01); *H04B 7/0626* (2013.01)

(58) Field of Classification Search
    CPC ............................ H04B 7/0639; H04B 7/0626
    See application file for complete search history.

(56) References Cited

U.S. PATENT DOCUMENTS

| | | | |
|---|---|---|---|
| 2014/0064401 A1 | 3/2014 | Wu et al. | |
| 2017/0187442 A1 | 6/2017 | Luddy et al. | |
| 2018/0041265 A1* | 2/2018 | Su | H04B 7/0658 |
| 2022/0271806 A1* | 8/2022 | Zhu | H04B 7/0456 |
| 2023/0096819 A1* | 3/2023 | Ni | H04B 7/0639 |
| | | | 343/702 |
| 2025/0023615 A1* | 1/2025 | Chi | H04B 7/0626 |

FOREIGN PATENT DOCUMENTS

| | | |
|---|---|---|
| CN | 102769484 B | 2/2016 |
| CN | 106209195 A | 12/2016 |
| CN | 107346982 A | 11/2017 |
| WO | 2021093591 A1 | 5/2021 |

* cited by examiner

*Primary Examiner* — Jaison Joseph

(74) *Attorney, Agent, or Firm* — Volpe Koenig

(57) ABSTRACT

A precoding information feedback method, including: obtaining precoding information transmitted by a receiver and determined according to channel state information (CSI).

18 Claims, 4 Drawing Sheets

---

Obtain a first PMI transmitted by a receiver, where the first PMI includes a first-dimension beam indicator and a second-dimension beam indicator in different modals, and the precoding information includes the first PMI    S51

Obtain a maximum number of modals of an OAM that can be used for transmitting under a current channel condition and transmitted by the receiver, where the precoding information includes the number of modals of the OAM    S52

Obtain a first indicator number, transmitted by the receiver, of a first modal combination selected for transmission, where the precoding information includes the first indicator number    S53

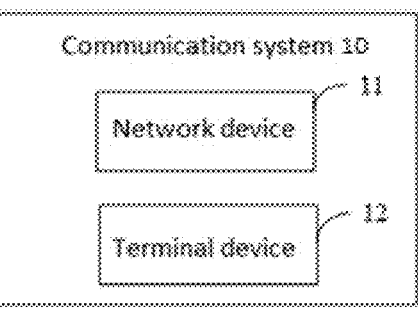

Fig. 1

Obtain precoding information transmitted by a receiver and determined according to CSI        S21

Fig. 2

Obtain a first PMI transmitted by a receiver, where the first PMI includes a first-dimension beam indicator and a second-dimension beam indicator in different modals, and the precoding information includes the first PMI        S31

Fig. 3

Obtain indication information transmitted by a receiver, and determine a first PMI according to the indication information        S41

Fig. 4

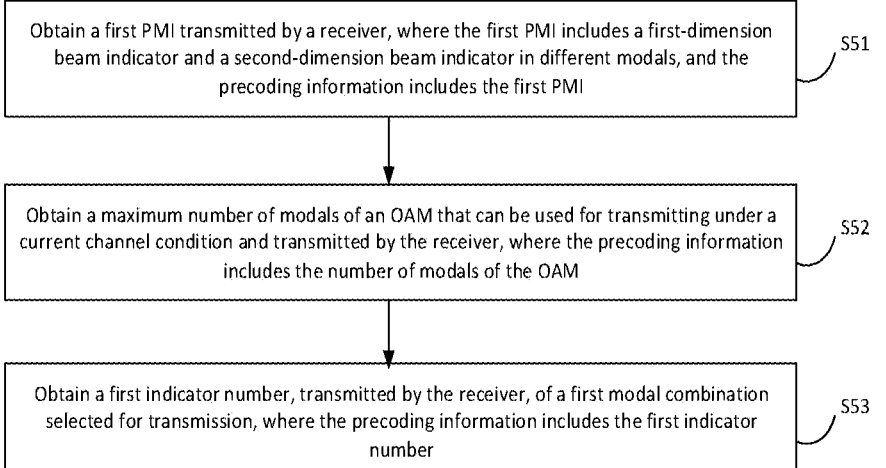

Fig. 5

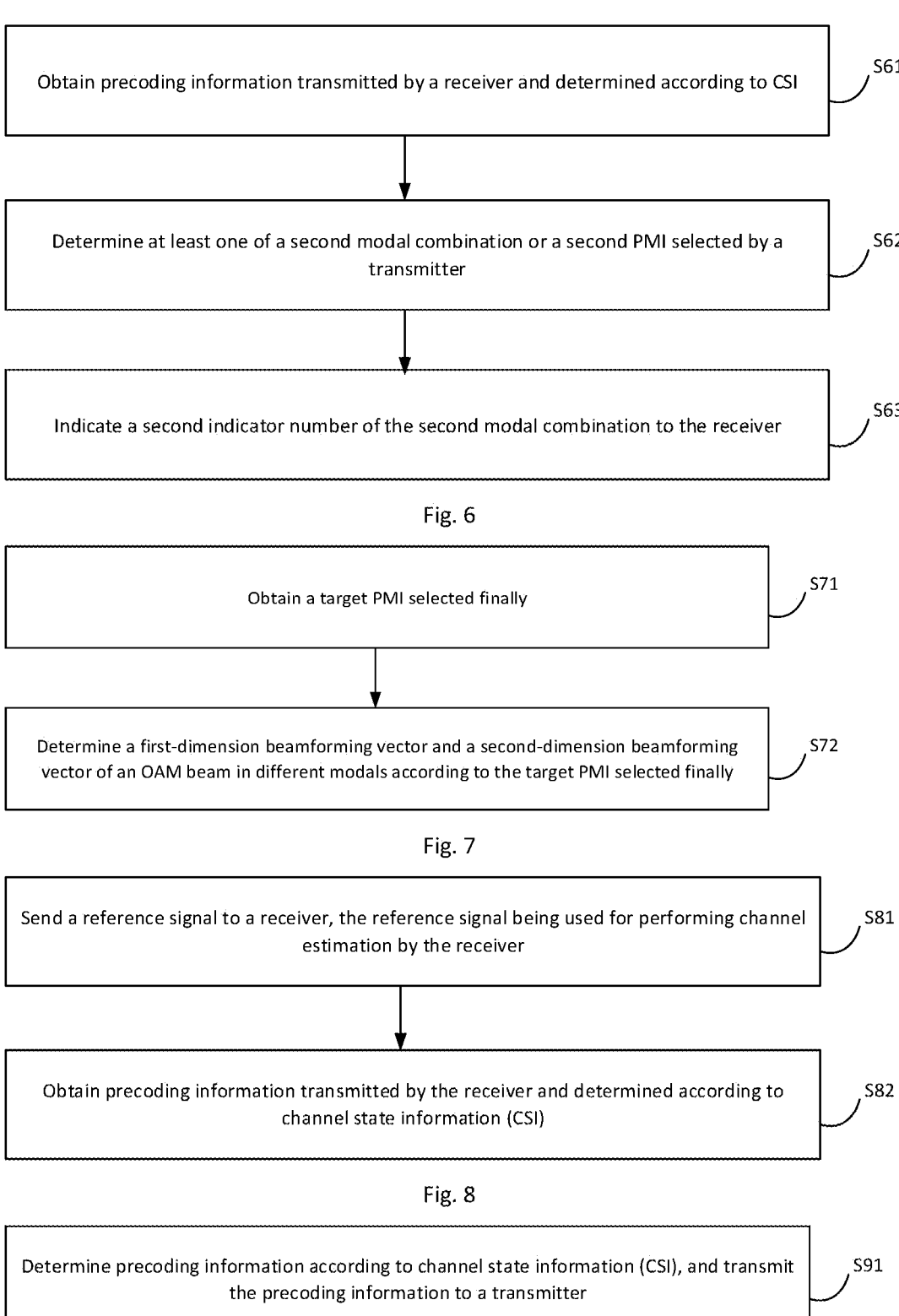

Obtain precoding information transmitted by a receiver and determined according to CSI          S61

Determine at least one of a second modal combination or a second PMI selected by a transmitter          S62

Indicate a second indicator number of the second modal combination to the receiver          S63

Fig. 6

Obtain a target PMI selected finally          S71

Determine a first-dimension beamforming vector and a second-dimension beamforming vector of an OAM beam in different modals according to the target PMI selected finally          S72

Fig. 7

Send a reference signal to a receiver, the reference signal being used for performing channel estimation by the receiver          S81

Obtain precoding information transmitted by the receiver and determined according to channel state information (CSI)          S82

Fig. 8

Determine precoding information according to channel state information (CSI), and transmit the precoding information to a transmitter          S91

Fig. 9

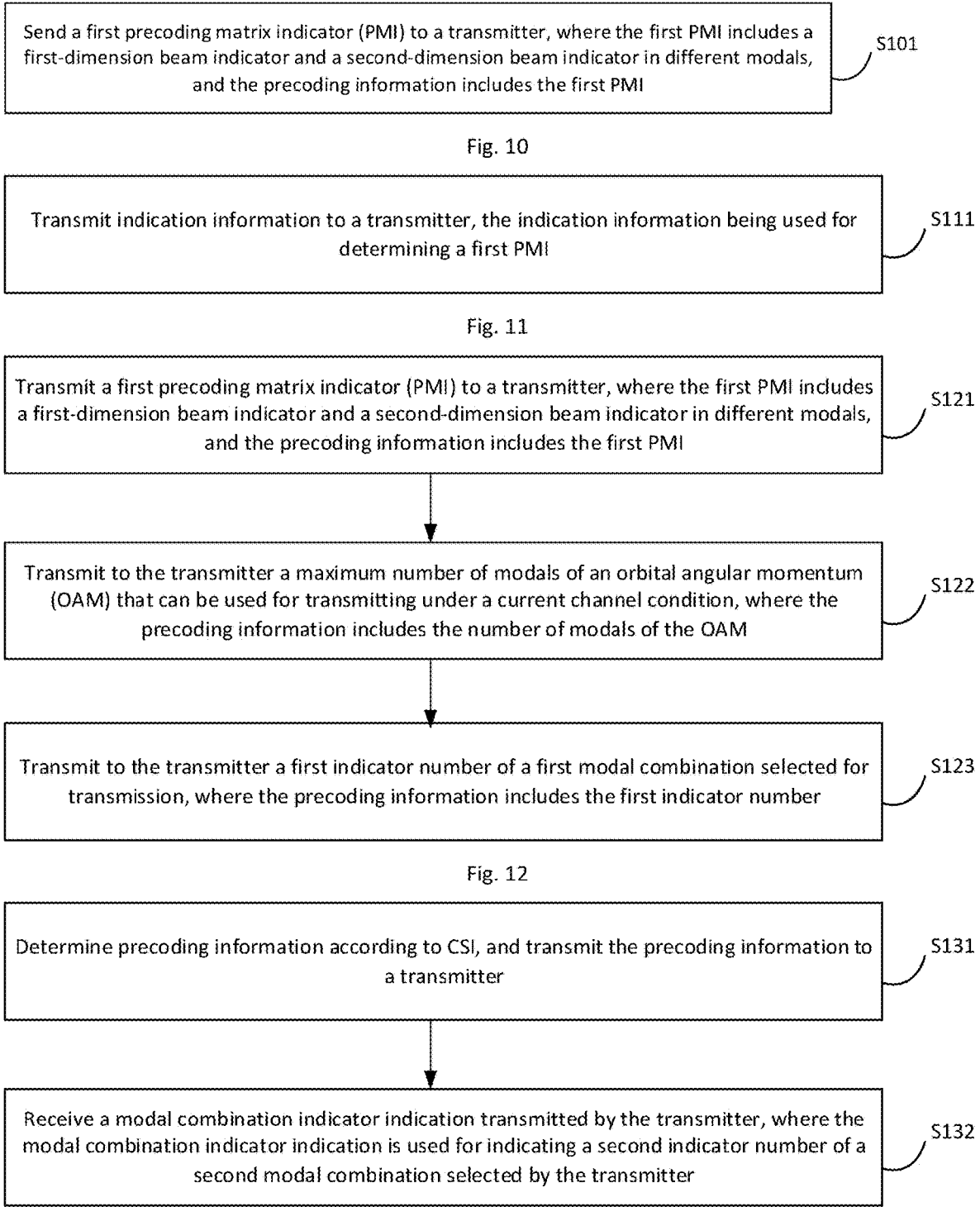

Send a first precoding matrix indicator (PMI) to a transmitter, where the first PMI includes a first-dimension beam indicator and a second-dimension beam indicator in different modals, and the precoding information includes the first PMI — S101

Fig. 10

Transmit indication information to a transmitter, the indication information being used for determining a first PMI — S111

Fig. 11

Transmit a first precoding matrix indicator (PMI) to a transmitter, where the first PMI includes a first-dimension beam indicator and a second-dimension beam indicator in different modals, and the precoding information includes the first PMI — S121

Transmit to the transmitter a maximum number of modals of an orbital angular momentum (OAM) that can be used for transmitting under a current channel condition, where the precoding information includes the number of modals of the OAM — S122

Transmit to the transmitter a first indicator number of a first modal combination selected for transmission, where the precoding information includes the first indicator number — S123

Fig. 12

Determine precoding information according to CSI, and transmit the precoding information to a transmitter — S131

Receive a modal combination indicator indication transmitted by the transmitter, where the modal combination indicator indication is used for indicating a second indicator number of a second modal combination selected by the transmitter — S132

Fig. 13

Receive a reference signal transmitted by a transmitter, and obtain CSI by performing channel estimation according to the reference signal    S141

Determine precoding information according to the CSI, and transmit the precoding information to the transmitter    S142

Communication device

Transceiving module    151

Processing module    152

150

PRECODING INFORMATION FEEDBACK METHOD AND DEVICE

CROSS-REFERENCE TO RELATED APPLICATION

The present application is a U.S. National Stage of International Application No. PCT/CN2021/133673, filed on Nov. 26, 2021, the contents of all of which are incorporated herein by reference in their entirety for all purposes.

BACKGROUND OF THE INVENTION

In related art, in order to improve spectrum efficiency, information is usually transmitted by using an orbital angular momentum (OAM). The OAM is independent of conventional modulation dimensions such as phase, frequency and polarization, and is regarded as a new modulation dimension.

SUMMARY OF THE INVENTION

Embodiments of the disclosure provide a precoding information feedback method and device, applied to the field of communication technology.

In a first aspect, an embodiment of the disclosure provides a precoding information feedback method, performed by a transmitter and including: obtaining precoding information transmitted by a receiver and determined according to channel state information (CSI).

In a second aspect, an embodiment of the disclosure provides another precoding information feedback method, performed by a receiver and including: determining precoding information according to channel state information (CSI), and transmitting the precoding information to a transmitter.

In a third aspect, an embodiment of the disclosure provides a communication device, including a processor. The processor, when calling a computer program in a memory, performs the method in the first aspect.

In a fourth aspect, an embodiment of the disclosure provides a communication device, including a processor. The processor, when calling a computer program in a memory, performs the method in the second aspect.

In a fifth aspect, an embodiment of the disclosure provides a communication device, including a processor and a memory. The memory stores a computer program. The processor executes the computer program stored in the memory so as to cause the communication device to perform the method in the first aspect.

In a sixth aspect, an embodiment of the disclosure provides a communication device, including a processor and a memory. The memory stores a computer program. The processor executes the computer program stored in the memory so as to cause the communication device to perform the method in the second aspect.

In a seventh aspect, an embodiment of the disclosure provides a communication device, including a processor and an interface circuit. The interface circuit is configured to receive a code instruction and transmit the code instruction to the processor. The processor is configured to run the code instruction so as to cause the device to perform the method in the first aspect.

In an eighth aspect, an embodiment of the disclosure provides a communication device, including a processor and an interface circuit. The interface circuit is configured to receive a code instruction and transmit the code instruction to the processor. The processor is configured to run the code instruction so as to cause the device to perform the method in the second aspect.

BRIEF DESCRIPTION OF DRAWINGS

In order to describe technical solutions in the embodiments of the disclosure or the background more clearly, accompanying drawings needed by the embodiments of the disclosure or the background will be described below.

FIG. 1 is a schematic architectural diagram of a communication system according to an embodiment of the disclosure.

FIG. 2 is a schematic flowchart of a precoding information feedback method according to an embodiment of the disclosure.

FIG. 3 is a schematic flowchart of a precoding information feedback method according to an embodiment of the disclosure.

FIG. 4 is a schematic flowchart of a precoding information feedback method according to an embodiment of the disclosure.

FIG. 5 is a schematic flowchart of a precoding information feedback method according to an embodiment of the disclosure.

FIG. 6 is a schematic flowchart of a precoding information feedback method according to an embodiment of the disclosure.

FIG. 7 is a schematic flowchart of a precoding information feedback method according to an embodiment of the disclosure.

FIG. 8 is a schematic flowchart of a precoding information feedback method according to an embodiment of the disclosure.

FIG. 9 is a schematic flowchart of a precoding information feedback method according to an embodiment of the disclosure.

FIG. 10 is a schematic flowchart of a precoding information feedback method according to an embodiment of the disclosure.

FIG. 11 is a schematic flowchart of a precoding information feedback method according to an embodiment of the disclosure.

FIG. 12 is a schematic flowchart of a precoding information feedback method according to an embodiment of the disclosure.

FIG. 13 is a schematic flowchart of a precoding information feedback method according to an embodiment of the disclosure.

DETAILED DESCRIPTION OF THE INVENTION

Figure 14:
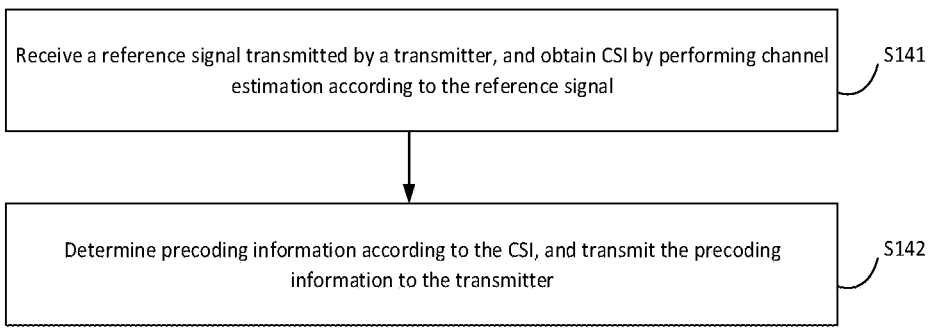
FIG. 14 is a schematic flowchart of a precoding information feedback method according to an embodiment of the disclosure.

Terms involved in the disclosure are introduced firstly for convenient understanding.
1. Channel State Information (CSI)

In the field of wireless communications, the so-called CSI is a channel attribute of a communication link. The CSI describes a fading factor of a signal on each transmission path, namely, a value of each element in a channel gain matrix H, such as signal scattering, environment fading, distance decay and other information. The CSI may make a communication system adapt to a current channel condition, which provides a guarantee for high-reliability and high-speed communication in a multi-antenna system.

2. Precoding Matrix Indicator (PMI)

In a long term evolution (LTE) system, for downlink transmission modes 4, 5 and 6, a terminal needs to report PMI information to a network side, and the network side processes downlink data using a precoding matrix corresponding to the PMI and transmits the processed downlink data to the terminal.

A candidate set of precoding matrices adopted currently is already determined in a 36.211 standard.

3. Orbital Angular Momentum (OAM)

The OAM represents the rotation of electrons around a propagation axis, which is generated by the rotation of an energy flow around an optical axis. The OAM makes a phase wavefront of an electromagnetic wave be in a vortex shape and is used for increasing wireless communication capacity. The OAM may be applied to the electromagnetic wave. A phase rotation factor is added in a normal electromagnetic wave, and in this case, a wavefront of the electromagnetic wave will no longer be a planar structure, but will rotate around a direction of beam propagation, which presents a helical phase structure. A phase wave advances every time a vortex wave rotates around the propagation axis by a circle.

In related art, in order to improve spectrum efficiency, information is usually transmitted by using an orbital angular momentum (OAM). The OAM is independent of conventional modulation dimensions such as phase, frequency and polarization, and is regarded as a new modulation dimension. However, in a misalignment scenario, there exists a large energy loss of the received signal at a receiver and a transmitter, and inter-modal interference exists. Thus, how to solve the problems of received-signal energy loss and inter-modal interference of the receiver and the transmitter in the misalignment scenario has become one of the important research directions.

In order to better understand a precoding information feedback method according to an embodiment of the disclosure, a communication system suitable for embodiments of the disclosure is described below first.

An embodiment of the disclosure provides a communication system. The communication system may include but is not limited to a transmitter and a receiver. In some embodiments, the transmitter may be a network device, and the receiver may be a terminal device. Please refer to FIG. 1, which is a schematic architectural diagram of a communication system according to an embodiment of the disclosure. The communication system 10 may include but is not limited to one network device and one terminal device. The number and form of devices shown in FIG. 1 are merely an example and do not constitute a limitation on the embodiments of the disclosure. Two or more than two network devices and two or more than two terminal devices may be included in actual application. The communication system 10 shown in FIG. 1 including a network device 11 and a terminal device 12 is taken as an example.

It is to be noted that the technical solutions of the embodiments of the disclosure may be applied to various communication systems, for example, a long term evolution (LTE) system, a 5th generation (5G) mobile communication system, a 5G new radio (NR) system, other future new mobile communication systems, or the like. It is to be further noted that a side link in the embodiments of the disclosure may also be called a sidelink.

The network device 11 in the embodiment of the disclosure is an entity on a network side for transmitting or receiving a signal. For example, the network device 11 may be an evolved NodeB (eNB), a transmission reception point (TRP), a next generation NodeB (gNB) in an NR system, a base station in another future mobile communication system, an access node in a wireless fidelity (Wi-Fi) system, or the like. The embodiments of the disclosure do not limit a specific technology and a specific device form adopted by the network device. The network device in the embodiments of the disclosure may include a central or centralized unit (CU) and a distributed unit (DU). The CU may also be called a control unit. A CU-DU structure may split protocol layers of the network device such as a base station. For example, functions of some protocol layers are under centralized control in the CU, and functions of some or all of the rest of the protocol layers are distributed in the DU which is under centralized control by the CU.

The terminal device 12 in the embodiments of the disclosure is an entity, for example, a mobile phone, on a user side for receiving or transmitting a signal. The terminal device may also be called a terminal, user equipment (UE), a mobile station (MS), a mobile terminal (MT), or the like. The terminal device may be an automobile, a smart car, a mobile phone, a wearable device and a pad which have a communication function, a computer with a wireless transceiving function, a virtual reality (VR) terminal device, an augmented reality (AR) terminal device, a wireless terminal device in industrial control, a wireless terminal device in self-driving, a wireless terminal device in a remote medical surgery, a wireless terminal device in a smart grid, a wireless terminal device in transportation safety, a wireless terminal device in a smart city, a wireless terminal device in a smart home, or the like. The embodiments of the disclosure do not limit a specific technology and a specific device form adopted by the terminal device.

It may be understood that the communication system described in the embodiments of the disclosure is intended to describe the technical solution of the embodiments of the disclosure more clearly but does not constitute a limitation on the technical solution in the embodiment of the disclosure. Those ordinarily skilled in the art may know that with evolution of a system architecture and emergence of a new service scene, the technical solution in the embodiment of the disclosure is also applicable to similar technical problems.

A precoding information feedback method and device according to the disclosure are introduced in detail below with reference to the accompanying drawings.

FIG. 2 is a schematic flowchart of a precoding information feedback method according to an embodiment of the disclosure. As shown in FIG. 2, the precoding information feedback method is performed by a transmitter and may include but is not limited to step S21.

Step S21 includes obtaining precoding information transmitted by a receiver and determined according to CSI.

The CSI describes a fading factor of a signal on each transmission path, namely, a value of each element in a channel gain matrix H, such as signal scattering, environment fading, distance decay and other information. The CSI may make a communication system adapt to a current channel condition, which provides a guarantee for high-reliability and high-speed communication in a multi-antenna system.

In the embodiment of the disclosure, the precoding information obtained by the transmitter is determined by the receiver according to the CSI, that is, the receiver selects or determines appropriate precoding information according to the CSI, namely, a current channel condition, and reports the precoding information to the transmitter, and correspondingly, the transmitter may receive the precoding information. For example, precoding information corresponding to a largest channel capacity may be determined according to the CSI.

In some embodiments, the receiver may explicitly transmit the precoding information to the transmitter, and correspondingly, the transmitter may explicitly obtain the precoding information. In some embodiments, the receiver may implicitly transmit the precoding information to the transmitter, and correspondingly, the transmitter may implicitly obtain the precoding information.

In some embodiments, the precoding information may be at least one of a PMI, a number of modals of an OAM and an indicator number of a modal combination of the OAM. The modal combination of the OAM includes a plurality of modals, for example, [−4, −3, −2, −1, 0, 1, 2, 3].

The modal combination of each OAM has an indicator number. The indicator number may indicate one modal combination. In some embodiments, the indicator number may be an Integer eigenvalue.

The PMI may indicate one precoding matrix. The precoding matrix includes a first-dimension beam indicator and a second-dimension beam indicator in different modals.

In the embodiment of the disclosure, the precoding information transmitted by the receiver and determined according to the CSI may be obtained. Since the precoding information is determined based on the CSI, the precoding information is suitable for the current channel condition, the problem of inter-modal interference in a misalignment scenario can be avoided, the signal energy loss is reduced, resource waste is avoided, and the OAM spectrum efficiency and spectrum utilization are improved.

FIG. 3 is a schematic flowchart of a precoding information feedback method according to an embodiment of the disclosure. As shown in FIG. 3, the precoding information feedback method is performed by the transmitter and may include but is not limited to step S31.

Step S31 includes obtaining a first PMI transmitted by the receiver, where the first PMI includes a first-dimension beam indicator and a second-dimension beam indicator in different modals, and the precoding information includes the first PMI.

In the embodiment of the disclosure, the precoding information includes the first PMI. In the disclosure, an OAM beamforming vector is divided into a first-dimension direction and a second-dimension direction, namely, the first PMI includes the first-dimension beam indicator and the second-dimension beam indicator in different modals.

The precoding information obtained by the transmitter is determined by the receiver according to the CSI, that is, the receiver selects or determines an appropriate first PMI according to the CSI, namely, a current channel condition, and reports the appropriate first PMI to the transmitter. Correspondingly, the transmitter may receive the first PMI. For example, a first PMI corresponding to a largest channel capacity may be determined according to the CSI.

In some embodiments, the receiver may explicitly transmit the first PMI to the transmitter, and correspondingly, the transmitter may explicitly obtain the first PMI. In some embodiments, the receiver may implicitly transmit the first PMI to the transmitter, and correspondingly, the transmitter may implicitly obtain the first PMI.

In the embodiment of the disclosure, the precoding information transmitted by the receiver and determined according to the CSI may be obtained. Since the precoding information is determined based on the CSI, the precoding information is suitable for the current channel condition, the problem of inter-modal interference in a misalignment scenario can be avoided, and the signal energy loss is reduced.

FIG. 4 is a schematic flowchart of a precoding information feedback method according to an embodiment of the disclosure. As shown in FIG. 4, the precoding information feedback method is performed by the transmitter and may include but is not limited to step S41.

Step S41 includes obtaining indication information transmitted by the receiver, and determining the first PMI according to the indication information.

In the embodiment of the disclosure, the receiver may implicitly indicate the first PMI to the transmitter through the indication information. That is, the transmitter may obtain the indication information transmitted by the receiver and used for determining the first PMI, and determine the first PMI according to the indication information.

In some embodiments, the indication information may be indicated to the transmitter through high-layer signaling or message.

In some embodiments, the indication information may include an intra-group offset value for the first-dimension beam indicator and an intra-group offset value for the second-dimension beam indicator in different modals.

In some embodiments, in a case that a beam indicator group does not change, the transmitter may obtain a first intra-group offset of a first-dimension indicator sub-group where the receiver is located and a second intra-group offset of a second-dimension indicator sub-group where the receiver is located that are in different modals and transmitted by the receiver. Then the first-dimension beam indicator and the second-dimension beam indicator in any modal may be obtained. That is to say, a first-dimension beam indicator in any modal is determined according to the first intra-group offset in any modal; and a second-dimension beam indicator in any modal is determined according to the second intra-group offset in any modal. The indication information includes the first intra-group offset and the second intra-group offset in different modals.

In some embodiments, the indication information may include a first-dimension sub-group offset and an intra-group offset value for the first-dimension beam indicator in different modals, as well as a second-dimension sub-group offset and an intra-group offset value for the second-dimension beam indicator in different modals. The receiver may move continuously, correspondingly leading to a change of a beam indicator group where the receiver is located. In a case that an indicator sub-group where the receiver is located changes, the transmitter obtains the intra-group offset value for the first-dimension beam indicator and the first group offset of the first-dimension indicator sub-group where the receiver is located as well as the intra-group offset value for the second-dimension beam indicator and the second group offset of the second-dimension indicator sub-group where the receiver is located that are in different modals and transmitted by the receiver. Further, the transmitter may re-determine, according to the included information, the first PMI, namely, a beam indicator of a first-dimension indicator and a beam indicator of a second-dimension indicator.

In other words, the transmitter determines the first-dimension beam indicator in any modal according to the first group offset and the first intra-group offset in any modal; and determines the second-dimension beam indicator in any modal according to the second group offset and the second intra-group offset in any modal. The indication information includes the first group offset and the second group offset in different modals as well as the first intra-group offset and the second intra-group offset in different modals.

For example, assuming that the first-dimension indicator sub-group and the second-dimension indicator sub-group in OAM modal 1 respectively have P and Q beams, the first intra-group offset and the second intra-group offset are respectively i and j, and the first group offset and the second group offset are respectively p and q, so beam indicators in two dimensions in this modal are respectively: the first-dimension beam indicator being $k_{1,j}=p \cdot P+i$; and the second-dimension beam indicator being $k_{2,j}=q \cdot Q+j$.

It needs to be noted that during continuation of the receiver in the same beam indicator group, the first group offset p and the second group offset q may be indicated to the transmitter in a case that the beam indicator sub-group changes, and during subsequent continuation, the first group offset p and the second group offset q are not indicated separately, and are re-indicated in a case that the indicator sub-group changes again.

In some embodiments, the receiver performs independent feedback on the indication information. In other words, the transmitter may receive independent indication information for each of the first intra-group offset, the second intra-group offset, the first group offset and the second group offset, namely, i, j, p and q may be indicated separately. For example, assuming that there are three types of first group offsets and five types of second group offsets, which are fed back separately, so it needs two bits to feed back the first group offsets and three bits to feed back the second group offsets, occupying a total of 5 bits.

In some other embodiments, in order to reduce resource occupation, the receiver may perform joint feedback on the indication information. For example, joint indication may be performed in a form of (i, j) and (p, q). In other words, the transmitter may receive joint indication information carrying the first intra-group offset, the second intra-group offset, the first group offset and the second group offset. For example, assuming that there are three types of first group offsets and five types of second group offsets, then 15 types of joint indication information need to be fed back, occupying a total of 4 bits.

By implementing the embodiment of the disclosure, the indication information transmitted by the receiver may be obtained, and the first PMI is determined according to the indication information. In this way, the precoding information is suitable for the current channel condition, thus the problem of inter-modal interference in a misalignment scenario can be avoided, the signal energy loss is reduced, resource waste is avoided, and the spectrum efficiency is improved.

FIG. 5 is a schematic flowchart of a precoding information feedback method according to an embodiment of the disclosure. As shown in FIG. 5, the precoding information feedback method is performed by the transmitter and may include but is not limited to steps S51, S52, and S53.

Step S51 includes obtaining a first PMI transmitted by the receiver, where the first PMI includes a first-dimension beam indicator and a second-dimension beam indicator in different modals, and the precoding information includes the first PMI.

The description of step S51 may refer to the related content in the included embodiments and is not described in detail here.

Step S52 includes obtaining a maximum number of modals of an OAM that can be used for transmitting under a current channel condition and transmitted by the receiver, where the precoding information includes the number of modals of the OAM.

The number of modals of the OAM is used for representing a number of modals included in a modal combination selected under the current channel condition. The number of modals is a maximum number of modals that can be used for transmitting under the current channel condition. For example, assuming that a modal combination used for actual transmission is [−4, −3, −2, −1, 0, 1, 2, 3], the number of modals of the OAM is 8.

In some embodiments, the number of modals of the OAM is a type of precoding information. The receiver may report the number of modals of the OAM and the first PMI to the transmitter at the same time, and correspondingly, the transmitter may obtain the number of modals of the OAM while obtaining the first PMI.

In some embodiments, the receiver may report the number of modals of the OAM and the first PMI to the transmitter separately, and correspondingly, the transmitter may obtain the first PMI and the number of modals of the OAM separately.

Step S53 includes obtaining a first indicator number, transmitted by the receiver, of a first modal combination selected for transmission, where the precoding information includes the first indicator number.

For example, a modal combination used for actual transmission is [−4, −3, −2, −1, 0, 1, 2, 3], the first indicator number may be 11.

In some embodiments, the first indicator number of the first modal combination is a type of precoding information. The receiver may report the first indicator number of the first modal combination and the first PMI to the transmitter at the same time, or may report the first indicator number of the first modal combination and the number of modals of the OAM to the transmitter at the same time.

In some embodiments, the receiver may report the first indicator number of the first modal combination and the first PMI to the transmitter separately, or report the first indicator number of the first modal combination and the number of modals of the OAM to the transmitter at the same time.

In the embodiments of the disclosure, the transmitter may obtain the first PMI, the number of modals of the OAM and the first indicator number. OAM beams in modals of different integer eigenvalues are mutually orthogonal, which can improve the spectrum efficiency. The transmitter may obtain the first PMI, the number of modals of the OAM and the first indicator number at the same time, or may obtain the first PMI, the number of modals of the OAM and the first indicator number separately.

By implementing the embodiments of the disclosure, the first PMI, the number of modals of the OAM and the first indicator number that are transmitted by the receiver may be obtained. In this way, the precoding information is suitable for the current channel condition. Thus, the problem of inter-modal interference in a misalignment scenario can be avoided, the signal energy loss is reduced, resource waste is avoided, and the spectrum efficiency is improved.

FIG. 6 is a schematic flowchart of a precoding information feedback method according to an embodiment of the disclosure. As shown in FIG. 6, the precoding information feedback method is performed by the transmitter and may include but is not limited to steps S61, S62, and S63.

Step S61 includes obtaining precoding information transmitted by the receiver and determined according to the CSI.

The description of step S61 may refer to the related content in the included embodiments and is not described in detail here.

It needs to be noted that in the embodiments of the disclosure, the precoding information includes the first PMI, the number of modals of the OAM and the first indicator number.

Step S62 includes determining at least one of a second modal combination or a second PMI selected by the transmitter.

In some embodiments, for the purpose of improving a service transmission speed or avoiding modal resource conflicts, the transmitter may reselect modal information such as at least one of an appropriate second modal combination or appropriate second PMI as required. In some embodiments, the transmitter may determine at least one of the second modal combination or the second PMI selected by the transmitter based on the demand of a carried service for a transmission speed and a block error rate (BLER). In some embodiments, the transmitter may correspond to a plurality of receivers, and the transmitter may perform scheduling based on multi-modal resources for avoiding the modal resource conflicts and then determine at least one of the second modal combination or the second PMI selected by the transmitter. In some embodiments, at least one of the second modal combination or the second PMI selected by the transmitter may be determined in combination with a service demand and the multi-modal resources. In some embodiments, the transmitter may obtain at least one of the multi-modal resources or the service demand of the transmitter based on configuration information.

Step S63 includes indicating a second indicator number of the second modal combination to the receiver.

In some embodiments, the second modal combination selected by the transmitter is determined, and the second indicator number of the second modal combination is indicated to the receiver. In some embodiments, explicit indication or implicit indication may be used, and the second indicator number may be transmitted to the receiver through high-layer signaling.

By implementing the embodiments of the disclosure, the precoding information transmitted by the receiver and determined according to the CSI may be obtained, and at least one of the second modal combination or the second PMI selected by the transmitter may be determined. In this way, the determined precoding information is suitable for the current channel condition, the modal information such as at least one of the appropriate second modal combination or appropriate second PMI are reselected as required, the service transmission speed may be improved, the modal resource conflicts are avoided, the OAM beams in different modals can be mutually orthogonal, not only the problem of inter-modal interference in the misalignment scenario can be avoided and the signal energy loss can be reduced, but also the resource waste is avoided, and the spectrum efficiency is improved.

FIG. 7 is a schematic flowchart of a precoding information feedback method according to an embodiment of the disclosure. As shown in FIG. 7, the precoding information feedback method is performed by the transmitter and may include but is not limited to steps S71 and S72.

Step S71 includes obtaining a target PMI selected finally.

In some embodiments, the target PMI selected finally is the first PMI transmitted by the receiver. In some embodiments, the target PMI selected finally is the second PMI selected by the transmitter.

The description of the first PMI and the second PMI may refer to the related content in the included embodiments and is not described in detail here.

Step S72 includes determining, according to the target PMI selected finally, a first-dimension beamforming vector and a second-dimension beamforming vector of an OAM beam in different modals.

Taking the OAM modal being 1 and the target PMIs in a first-dimension direction and a second-dimension direction being $k_{1,l}$, $k_{2,l}$ respectively as an example, the first-dimension beamforming vector and the second-dimension beamforming vector of the OAM beam may be determined through the following formulas:

$$w_{2,k_{2,l}} = [1, \ e^{j2\pi \cdot \frac{k_{w,l}}{NO_2} \cdot \sin\left(\frac{2\pi}{N}\right)}, \ \dots \ , e^{j2\pi \cdot \frac{k_{2,l}}{NO_2} \cdot \sin\left(\frac{2\pi n}{N}\right)}, \ \dots \ , e^{j2\pi \cdot \frac{k_{2,l}}{NO_2} \cdot \sin\left(\frac{2\pi(N-1)}{N}\right)}]$$

$$w_{1,k_{1,l}} = [e^{j2\pi \cdot \frac{k_{1,l}}{NO_1}}, \ e^{j2\pi \cdot \frac{k_{1,l}}{NO_1} \cdot \cos\left(\frac{2\pi}{N}\right)}, \ \dots \ , e^{j2\pi \cdot \frac{k_{1,l}}{NO_1} \cdot \cos\left(\frac{2\pi n}{N}\right)}, \ \dots \ , e^{j2\pi \cdot \frac{k_{1,l}}{NO_1} \cdot \cos\left(\frac{2\pi(N-1)}{N}\right)}]$$

Where $w_{1,k_{1,l}}$, $w_{2,k_{2,l}}$ represent the first-dimension beamforming vector and the second-dimension beamforming vector of the OAM beam respectively, N is a number of logical antenna arrays of the transmitter, n represents an $n^{th}$ logical antenna, and $O_1$ and $O_2$ represent oversampling factors in the first dimension and the second dimension respectively.

By implementing the embodiments of the disclosure, the first-dimension beamforming vector and the second-dimension beamforming vector of the OAM beam in different modals may be determined according to the target PMI selected finally. In this way, the determined precoding information is suitable for the current channel condition, the OAM beams are encoded in two dimensions according to a set precoding manner based on the precoding information, the OAM beams in different modals can be mutually orthogonal, not only the problem of inter-modal interference in the misalignment scenario can be avoided and the signal energy loss can be reduced, but also the resource waste is avoided and the spectrum efficiency is improved.

FIG. 8 is a schematic flowchart of a precoding information feedback method according to an embodiment of the disclosure. As shown in FIG. 8, the precoding information feedback method is performed by the transmitter and may include but is not limited to steps S81 and S82.

Step S81 includes transmitting a reference signal to the receiver, the reference signal being used for performing channel estimation by the receiver.

The reference signal is transmitted to the receiver. After receiving the reference signal, the receiver performs channel estimation based on the reference signal to obtain a channel gain matrix H, namely, the CSI.

The reference signal may be a cell reference signal (CRS), a demodulation reference signal (DRS), a sounding reference signal (SRS) or a demodulation reference signal (DMRS).

The receiver may perform estimation on a channel based on reference information. In some embodiments, channel estimation is performed based on reference signal receiving power (RSRP), a received signal strength indication (RSSI), reference signal receiving quality (RSRQ), a signal to interference plus noise ratio (SINR) and the like, so as to obtain the channel state information (CSI).

Step S82 includes obtaining the precoding information transmitted by the receiver and determined according to the channel state information (CSI).

The description of step S81 may refer to the related content in the included embodiments and is not described in detail here.

It needs to be noted that in the embodiments of the disclosure, the precoding information includes the first PMI, the number of modals of the OAM and the first indicator number.

By implementing the embodiments of the disclosure, the precoding information transmitted by the receiver and determined according to the channel state information (CSI) may be obtained, and the reference signal is transmitted to the receiver, the reference signal being used for performing channel estimation by the receiver. In this way, the determined precoding information is suitable for the current channel condition, the problem of inter-modal interference in the misalignment scenario can be avoided, the signal energy loss is reduced, the resource waste is avoided, and the spectrum efficiency is improved.

FIG. 9 is a schematic flowchart of a precoding information feedback method according to an embodiment of the disclosure. As shown in FIG. 9, the precoding information feedback method is performed by a receiver and may include but is not limited to step S91.

Step S91 includes determining precoding information according to channel state information (CSI), and transmitting the precoding information to a transmitter.

The CSI describes a fading factor of a signal on each transmission path, namely, a value of each element in a channel gain matrix H, such as signal scattering, environment fading, distance decay and other information. The CSI may make a communication system adapt to a current channel condition, which provides guarantee for high-reliability and high-speed communication in a multi-antenna system.

In the embodiments of the disclosure, the receiver selects or determines appropriate precoding information according to the CSI, namely, the current channel condition, and reports the precoding information to the transmitter, and correspondingly, the transmitter may receive the precoding information. For example, the receiver may determine precoding information corresponding to a largest channel capacity according to the CSI.

In some embodiments, the receiver may explicitly transmit the precoding information to the transmitter, and correspondingly, the transmitter may explicitly obtain the precoding information. In some embodiments, the receiver may implicitly transmit the precoding information to the transmitter, and correspondingly, the transmitter may implicitly obtain the precoding information.

In some embodiments, the precoding information may be at least one of a PMI, a number of modals of an OAM and an indicator number of a modal combination of the OAM.

The modal combination of the OAM includes a plurality of modals, for example, [−4, −3, −2, −1, 0, 1, 2, 3].

The modal combination of each OAM has an indicator number. The indicator number may indicate one modal combination. In some embodiments, the indicator number may be an integer eigenvalue.

The PMI may indicate one precoding matrix. The precoding matrix includes a first-dimension beam indicator and a second-dimension beam indicator in different modals.

In the embodiments of the disclosure, the precoding information may be determined according to the channel state information (CSI) and transmitted to the transmitter. Since the precoding information is determined based on the CSI, the precoding information is suitable for the current channel condition, the problem of inter-modal interference in a misalignment scenario can be avoided, the signal energy loss is reduced, resource waste is avoided, and the OAM spectrum efficiency and spectrum utilization are improved.

FIG. 10 is a schematic flowchart of a precoding information feedback method according to an embodiment of the disclosure. As shown in FIG. 10, the precoding information feedback method is performed by the receiver and may include but is not limited to step S101.

Step S101 includes transmitting a first precoding matrix indicator (PMI) to the transmitter, where the first PMI includes a first-dimension beam indicator and a second-dimension beam indicator in different modals, and the precoding information includes the first PMI.

In the embodiments of the disclosure, the precoding information includes the first PMI. An OAM beamforming vector is divided into a first-dimension direction and a second-dimension direction, namely, the first PMI includes the first-dimension beam indicator and the second-dimension beam indicator in different modals.

The receiver selects or determines an appropriate first PMI according to the CSI, namely, the current channel condition, and reports the appropriate first PMI to the transmitter, and correspondingly, the transmitter may receive the first PMI. For example, a first PMI corresponding to a largest channel capacity may be determined according to the CSI.

In some embodiments, the receiver may explicitly transmit the first PMI to the transmitter, and correspondingly, the transmitter may explicitly obtain the first PMI. In some embodiments, the receiver may implicitly transmit the first PMI to the transmitter, and correspondingly, the transmitter may implicitly obtain the first PMI.

In the embodiments of the disclosure, the first precoding matrix indicator (PMI) may be transmitted to the transmitter. Since the precoding information is determined based on the CSI, the precoding information is suitable for the current channel condition, the problem of inter-modal interference in a misalignment scenario can be avoided, and the signal energy loss is reduced.

FIG. 11 is a schematic flowchart of a precoding information feedback method according to an embodiment of the disclosure. As shown in FIG. 11, the precoding information feedback method is performed by the receiver and may include but is not limited to step S111.

Step S111 includes transmitting indication information to the transmitter, the indication information being used for determining the first PMI.

In the embodiments of the disclosure, the receiver may implicitly indicate the first PMI to the transmitter through the indication information. That is to say, the transmitter may obtain the indication information transmitted by the receiver and used for determining the first PMI, and determine the first PMI according to the indication information.

In some embodiments, the indication information may be indicated to the transmitter through high-layer signaling or message.

In some embodiments, the indication information may include an intra-group offset value for the first-dimension beam indicator and an intra-group offset value for the second-dimension beam indicator in different modals.

In some embodiments, the receiver may continue in the same beam indicator group for a period of time. In a case that the beam indicator group does not change, the receiver transmits to the transmitter a first intra-group offset of a first-dimension indicator sub-group where the receiver is located and a second intra-group offset of a second-dimension indicator sub-group where the receiver is located that are in different modals, and then the transmitter may obtain the first-dimension beam indicator and the second-dimension beam indicator in any modal. Further, the transmitter may determine a first-dimension beam indicator in any modal according to the first intra-group offset in any modal; and determine a second-dimension beam indicator in any modal according to the second intra-group offset in any modal. The indication information includes the first intra-group offset and the second intra-group offset in different modals.

In some embodiments, the indication information may include a first-dimension sub-group offset and an intra-group offset value for the first-dimension beam indicator in different modals, as well as a second-dimension sub-group offset and an intra-group offset value for the second-dimension beam indicator in different modals. The receiver may move continuously, correspondingly leading to change of the beam indicator group where the receiver is located. In a cast that an indicator sub-group where the receiver is located changes, the receiver transmits to the transmitter the intra-group offset value for the first-dimension beam indicator and the first group offset of the first-dimension indicator sub-group where the receiver is located as well as the intra-group offset value for the second-dimension beam indicator and the second group offset of the second-dimension indicator sub-group where the receiver is located that are in different modals, and the transmitter may re-determine, according to the included information, the first PMI, namely, a beam indicator of a first-dimension indicator and a beam indicator of a second-dimension indicator.

In other words, the transmitter determines the first-dimension beam indicator in any modal according to the first group offset and the first intra-group offset in any modal, and determines the second-dimension beam indicator in any modal according to the second group offset and the second intra-group offset in any modal.

For example, assuming that the first-dimension indicator sub-group and the second-dimension indicator sub-group in OAM modal l respectively have P and Q beams, the first intra-group offset and the second intra-group offset are respectively i and j, the first group offset and the second group offset are respectively p and q, so beam indicators in two dimensions in this modal are respectively: the first-dimension beam indicator being $k_{1,j} = p \cdot P + i$; and the second-dimension beam indicator being $k_{2,j} = q \cdot Q + j$ It needs to be noted that during continuation of the receiver in the same beam indicator group, the first group offset p and the second group offset q may be indicated to the transmitter in a case that the beam indicator sub-group changes, and during subsequent continuation, the first group offset p and the second group offset q are not indicated separately, and are re-indicated to the transmitter in a case that the indicator sub-group changes again.

In some embodiments, the receiver performs independent feedback on the indication information. In other words, the transmitter may receive independent indication information for each of the first intra-group offset, the second intra-group offset, the first group offset and the second group offset, namely, i, j, p and q may be indicated separately. For example, assuming that there are three types of first group offsets and five types of second group offsets, which are fed back separately, so it needs two bits to feedback the first group offsets and three bits to feedback the second group offsets, occupying a total of 5 bits.

In some other embodiments, in order to reduce resource occupation, the receiver may perform joint feedback on the indication information. For example, joint indication may be performed in a form of (i, j) and (p, q). In other words, the transmitter may receive joint indication information carrying the first intra-group offset, the second intra-group offset, the first group offset and the second group offset. For example, assuming that there are three types of first group offsets and five types of second group offsets, then 15 types of joint indication information need to be fed back, occupying a total of 4 bits.

By implementing the embodiment of the disclosure, the indication information may be transmitted to the transmitter, and the indication information is used for determining the first PMI. In this way, the problem of inter-modal interference in the misalignment scenario can be avoided, the signal energy loss is reduced, the resource waste is avoided, and the spectrum efficiency is improved, and the precoding information is suitable for the current channel condition.

FIG. 12 is a schematic flowchart of a precoding information feedback method according to an embodiment of the disclosure. As shown in FIG. 12, the precoding information feedback method is performed by the receiver and may include but is not limited to steps S121, S122 and S123.

Step S121 includes transmitting the first precoding matrix indicator (PMI) to the transmitter, where the first PMI includes a first-dimension beam indicator and a second-dimension beam indicator in different modals, and the precoding information includes the first PMI.

The description of step S121 may refer to the related content in the included embodiments and is not described in detail here.

Step S122 includes transmitting to the transmitter the maximum number of modals of an orbital angular momentum (OAM) that can be used for transmitting under the current channel condition, where the precoding information includes the number of modals of the OAM.

The number of modals of the OAM is used for representing a number of modals included in a modal combination selected under the current channel condition. The number of modals is the maximum number of modals that can be used for transmitting under the current channel condition. For example, assuming that a modal combination used for actual transmission is [−4, −3, −2, −1, 0, 1, 2, 3], then the number of modals of the OAM is 8.

In some embodiments, the number of modals of the OAM is a type of precoding information. The receiver may reports the number of modals of the OAM and the first PMI to the transmitter at the same time.

In some embodiments, the receiver may report the number of modals of the OAM and the first PMI to the transmitter separately.

Step S123 includes transmitting to the transmitter a first indicator number of a first modal combination selected for transmission, where the precoding information includes the first indicator number.

For example, a modal combination used for actual transmission is [−4, −3, −2, −1, 0, 1, 2, 3], the first indicator number may be 11.

In some embodiments, the first indicator number of the first modal combination is a type of precoding information. The receiver may report the first indicator number of the first modal combination and the first PMI to the transmitter at the same time, or may report the first indicator number of the first modal combination and the number of modals of the OAM to the transmitter at the same time.

In some embodiments, the receiver may report the first indicator number of the first modal combination and the first PMI to the transmitter separately, or report the first indicator number of the first modal combination and the number of modals of the OAM to the transmitter at the same time.

In the embodiments of the disclosure, the first PMI, the number of modals of the OAM and the first indicator number may be transmitted to the transmitter. OAM beams in modals of different integer eigenvalues are mutually orthogonal, which can improve the spectrum efficiency.

By implementing the embodiments of the disclosure, the first PMI, the number of modals of the OAM and the first indicator number are transmitted to the transmitter. In this way, the precoding information is suitable for the current channel condition, thus the problem of inter-modal interference in the misalignment scenario can be avoided, the signal energy loss is reduced, the resource waste is avoided, and the spectrum efficiency is improved.

FIG. 13 is a schematic flowchart of a precoding information feedback method according to an embodiment of the disclosure. As shown in FIG. 13, the precoding information feedback method is performed by the receiver and may include but is not limited to steps S131 and S132.

Step S131 includes determining the precoding information according to the CSI, and transmitting the precoding information to the transmitter.

The description of step S131 may refer to the related content in the included embodiments and is not described in detail here.

It needs to be noted that in the embodiments of the disclosure, the precoding information includes the first PMI, the number of modals of the OAM and the first indicator number.

Step S132 includes receiving a modal combination indicator indication transmitted by the transmitter, where the modal combination indicator indication is used for indicating a second indicator number of a second modal combination selected by the transmitter.

In some embodiments, for the purpose of improving a service transmission speed or avoiding modal resource conflicts, the transmitter may reselect modal information such as at least one of an appropriate second modal combination or appropriate second PMI as required. In some embodiments, the transmitter may determine at least one of the second modal combination or the second PMI based on the demand of a carried service for a transmission speed and a block error rate (BLER). In some embodiments, the transmitter may correspond to a plurality of receivers, and the transmitter may perform scheduling based on multi-modal resources for avoiding the modal resource conflicts and then determine at least one of the second modal combination or the second PMI. In some embodiments, the transmitter may determine at least one of the second modal combination or the second PMI in combination with a service demand and the multi-modal resources. In some embodiments, the transmitter may obtain at least one of the multi-modal resources or the service demand of the transmitter based on configuration information.

In order to perform information transmission with the receiver, the transmitter may indicate the second modal combination selected by the transmitter to the receiver through the modal combination indicator indication. The receiver may receive the modal combination indicator indication transmitted by the transmitter and may determine the second indicator number of the second modal combination selected by the transmitter according to the modal combination indicator indication and then determine the second modal combination selected by the transmitter.

By implementing the embodiments of the disclosure, the precoding information may be determined according to channel state information (CSI), and transmitted to the transmitter, and the modal combination indicator indication transmitted by the transmitter is received, where the modal combination indicator indication is used for indicating the second indicator number of the second modal combination selected by the transmitter. In this way, the precoding information is suitable for the current channel condition, the problem of inter-modal interference in the misalignment scenario can be avoided, the signal energy loss is reduced, the resource waste is avoided, and the OAM spectrum efficiency is improved.

FIG. 14 is a schematic flowchart of a precoding information feedback method according to an embodiment of the disclosure. As shown in FIG. 14, the precoding information feedback method is performed by the receiver and may include but is not limited to steps S141 and S142.

Step S141 includes receiving a reference signal transmitted by the transmitter, and obtaining the CSI by performing, according to the reference signal, channel estimation.

The reference signal transmitted by the transmitter is received, and channel estimation is performed based on the reference signal to obtain a channel gain matrix H, namely, the CSI. The reference signal may be a CRS, a DRS, an SRS or a DMRS.

The receiver may perform estimation on a channel based on the reference signal. In some embodiments, channel estimation is performed based on the RSRP, the RSSI, the RSRQ, a signal to noise ratio, an SINR and the like to obtain the CSI.

Step S142 includes determining the precoding information according to the CSI, and transmitting the precoding information to the transmitter.

In the embodiments of the disclosure, the precoding information includes the first PMI, the number of modals of the OAM and the first indicator number.

The receiver selects or determines appropriate precoding information according to the CSI, namely, the current channel condition, and reports the precoding information to the transmitter. The receiver determines an optimal precoding vector and an optimal modal combination according to the CSI. In some embodiments, a precoding vector and a modal combination corresponding to a largest channel capacity may be determined as the optimal precoding vector and the optimal modal combination according to the CSI. After the optimal precoding vector and the optimal modal combination are determined, the first PMI may be determined according to the optimal precoding vector, the number of modals of the OAM and the first indicator number are determined according to the optimal modal combination, and the first PMI, the number of modals of the OAM and the first indicator number are determined as the precoding information.

By implementing the embodiments of the disclosure, the reference signal transmitted by the transmitter may be received, the CSI is obtained by performing channel estimation according to the reference signal, and the precoding information is determined according to the CSI and transmitted to the transmitter. In this way, the precoding information is suitable for the current channel condition, the problem of inter-modal interference in the misalignment scenario can be avoided, the signal energy loss is reduced, the resource waste is avoided, and the spectrum efficiency is improved.

In the included embodiments according to the disclosure, the methods according to the embodiments of the disclosure are introduced respectively from the perspectives of the transmitter and the receiver. In order to implement the various functions in the included methods according to the embodiments of the disclosure, the transmitter and the receiver may include a hardware structure and a software module, and the included various functions are implemented in a form of the hardware structure, the software module or the hardware structure plus the software module. A certain function in the included various functions may be performed in a form of the hardware structure, the software module, or the hardware structure plus the software module.

Figure 15:
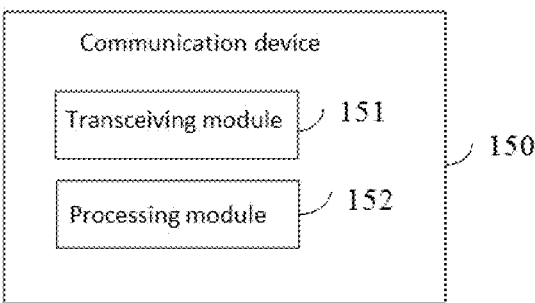
FIG. 15 is a schematic structural diagram of a communication device according to an embodiment of the disclosure.

Please refer to FIG. 15, which is a schematic structural diagram of a communication device 150 according to an embodiment of the disclosure. The communication device 150 shown in FIG. 15 may include a transceiving module 151 and a processing module 152. The transceiving module 151 may include at least one of a transmitting (or transmitter) module or a receiving module. The transmitting module is configured to implement a transmitting function. The receiving module is configured to implement a receiving function. The transceiving module 151 may implement at least one of the transmitting function or the receiving function.

The communication device 150 may be a receiver (such as the receiver in the included method embodiments), or a device in the receiver, or a device capable of being used in conjunction with the receiver. Alternatively, the communication device 150 may be a transmitter, or a device in the transmitter, or a device capable of being used in conjunction with the transmitter.

The communication device 150 is the transmitter (such as the transmitter in the included method embodiments), including: a transceiving module 151, configured to obtain precoding information transmitted by a receiver and determined according to channel state information (CSI).

In some embodiments, the transceiving module 151 is further configured to: obtain a first precoding matrix indicator (PMI) transmitted by the receiver, where the first PMI includes a first-dimension beam indicator and a second-dimension beam indicator in different modals, and the precoding information includes the first PMI.

In some embodiments, the communication device 150 further includes: a processing module 152, configured to obtain indication information transmitted by the receiver, and determine the first PMI according to the indication information. The processing module 152 may be any type of processor, controller, or similar device known by those of ordinary skill in the art.

In some embodiments, the processing module 152 is further configured to: obtain a first intra-group offset of a first-dimension indicator sub-group where the receiver is located and a second intra-group offset of a second-dimension indicator sub-group where the receiver is located that are in different modals and transmitted by the receiver, where the indication information includes the first intra-group offset and the second intra-group offset in different modals; determine a first-dimension beam indicator in any modal according to the first intra-group offset in any modal; and determine a second-dimension beam indicator in any modal according to the second intra-group offset in any modal.

In some embodiments, the processing module 152 is further configured to: obtain a first group offset of the first-dimension indicator sub-group where the receiver is located and a second group offset of the second-dimension indicator sub-group where the receiver is located that are in different modals and transmitted by the receiver, the indication information further including the first group offset and the second group offset; determine a first-dimension beam indicator in any modal according to the first group offset and the first intra-group offset in any modal; and determine a second-dimension beam indicator in any modal according to the second group offset and the second intra-group offset in any modal.

In some embodiments, the transceiving module 151 is further configured to: receive independent indication information of each of the first intra-group offset, the second intra-group offset, the first group offset and the second group offset; or receive joint indication information carrying the first intra-group offset, the second intra-group offset, the first group offset and the second group offset.

In some embodiments, the transceiving module 151 is further configured to: obtain a maximum number of modals of an orbital angular momentum (OAM) that can be used for transmitting under a current channel condition and transmitted by the receiver, where the precoding information includes the number of modals of the OAM.

In some embodiments, the transceiving module 151 is further configured to: obtain a first indicator number, transmitted by the receiver, of a first modal combination selected for transmission, where the precoding information includes the first indicator number.

In some embodiments, the processing module 152 is further configured to: determine at least one of a second modal combination or a second PMI selected by the transmitter; and indicate a second indicator number of the second modal combination to the receiver.

In some embodiments, the processing module 152 is further configured to: determine, according to a target PMI selected finally, a first-dimension beamforming vector and a second-dimension beamforming vector of an OAM beam in different modals, where the target PMI is the first PMI or a second PMI.

In some embodiments, the processing module 152 is further configured to: determine an OAM modal in a modal combination selected finally, a number of logical antenna arrays of the transmitter and an oversampling factor; determine a first-dimension beamforming vector of an OAM beam in any modal according to any modal, the number of logical antenna arrays, the oversampling factor and a first-dimension beam indicator in any modal included in the target PMI; and determine a second-dimension beamforming vector of the OAM beam in any modal according to any modal, the number of logical antenna arrays, the oversampling factor and a second-dimension beam indicator in any modal included in the target PMI.

In some embodiments, the transceiving module 151 is further configured to: transmit a reference signal to the receiver, the reference signal being used for performing channel estimation by the receiver.

In the embodiments of the disclosure, the precoding information transmitted by the receiver and determined according to the CSI may be obtained. Since the precoding information is determined based on the CSI, the precoding information is suitable for the current channel condition, the problem of inter-modal interference in a misalignment scenario can be avoided, the signal energy loss is reduced, resource waste is avoided, and the OAM spectrum efficiency is improved.

The communication device 150 is a receiver, including: the processing module 152, configured to determine precoding information according to channel state information (CSI); and the transceiving module 151, configured to transmit the precoding information to a transmitter.

In some embodiments, the transceiving module 151 is further configured to: transmit a first precoding matrix indicator (PMI) to the transmitter, where the first PMI includes a first-dimension beam indicator and a second-dimension beam indicator in different modals, and the precoding information includes the first PMI.

In some embodiments, the transceiving module 151 is further configured to: transmit indication information to the transmitter, the indication information being used for determining the first PMI.

In some embodiments, the transceiving module 151 is further configured to: transmit to the transmitter a first intra-group offset of a first-dimension indicator sub-group where the receiver is located and a second intra-group offset of a second-dimension indicator sub-group where the receiver is located that are in different modals, where the indication information includes the first intra-group offset and the second intra-group offset in different modals; the first intra-group offset in any modal is used for determining a first-dimension beam indicator in any modal, and the second intra-group offset in any modal is used for determining a second-dimension beam indicator in any modal.

In some embodiments, the transceiving module 151 is further configured to: transmit to the transmitter a first group offset of the first-dimension indicator sub-group where the receiver is located and a second group offset of the second-dimension indicator sub-group where the receiver is located that are in different modals, where the indication information further includes the first group offset and the second group offset, the first group offset and the first intra-group offset in any modal are used for determining a first-dimension beam indicator in any modal, and the second group offset and the second intra-group offset in any modal are used for determining a second-dimension beam indicator in any modal.

In some embodiments, the transceiving module 151 is further configured to: transmit to the transmitter indication information of each of the first intra-group offset, the second intra-group offset, the first group offset and the second group offset; or transmit to the transmitter joint indication information carrying the first intra-group offset, the second intra-group offset, the first group offset and the second group offset.

In some embodiments, the transceiving module 151 is further configured to: transmit to the transmitter a maximum number of modals of an orbital angular momentum (OAM) that can be used for transmitting under a current channel condition, where the precoding information includes the number of modals of the OAM.

In some embodiments, the transceiving module 151 is further configured to: transmit to the transmitter a first indicator number of a first modal combination selected for transmission, where the precoding information includes the first indicator number.

In some embodiments, the transceiving module 151 is further configured to: receive a modal combination indicator indication transmitted by the transmitter, where the modal combination indicator indication is used for indicating a second indicator number of a second modal combination selected by the transmitter.

In some embodiments, the processing module 152 is further configured to: determine an optimal precoding vector and an optimal modal combination according to the CSI; and determine the precoding information according to the optimal precoding vector and the optimal modal combination.

In some embodiments, the transceiving module 151 is further configured to: receive a reference signal transmitted by the transmitter, and obtain the CSI by performing channel estimation according to the reference signal.

In the embodiments of the disclosure, the precoding information may be determined according to the channel state information (CSI) and transmitted to the transmitter. Since the precoding information is determined based on the CSI, the precoding information is suitable for the current channel condition, the problem of inter-modal interference in a misalignment scenario can be avoided, the signal energy loss is reduced, resource waste is avoided, and the OAM spectrum efficiency is improved.

Figure 16:
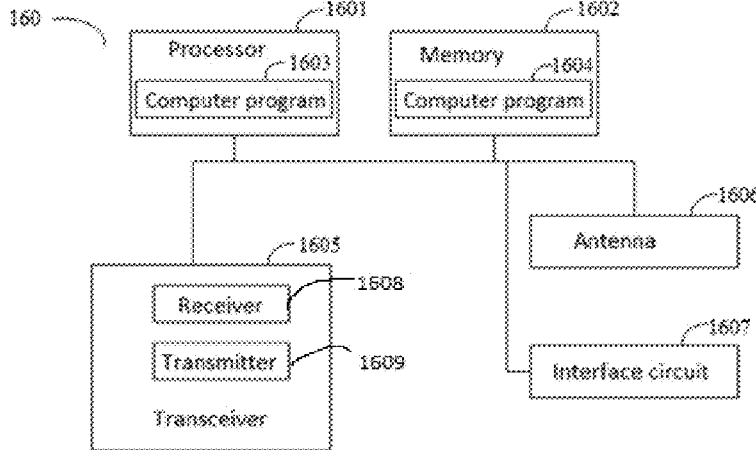
FIG. 16 is a schematic structural diagram of a communication device according to an embodiment of the disclosure.

FIG. 16 is a schematic structural diagram of another communication device 160 according to an embodiment of the disclosure. The communication device 160 may be a transmitter or a receiver (such as the receiver in the included method embodiments), may also be a chip, a chip system, a processor, or the like supporting the transmitter to implement any included methods, and may also be a chip, a chip system, a processor or the like supporting the receiver to implement any of the included methods. The device 160 may be configured to implement any method described in the method embodiments.

The communication device 160 may include one or more processors 1601. The processor 1601 may be a general-purpose processor, a special-purpose processor or the like. For example, the processor may be a baseband processor or a central processing unit. The baseband processor may be configured to process a communication protocol and communication data. The central processing unit may be configured to control the communication device (such as a base station, a baseband chip, a receiver, a receiver chip, a DU, a CU or the like) to execute a computer program and process data of the computer program.

In some embodiments, the communication device 160 may further include one or more memories 1602 which may store a computer program 1604. The processor 1601 executes the computer program 1604 so as to cause the communication device 160 to perform the method described in the included method embodiments. In some embodiments, the memory 1602 may further store data. The communication device 160 and the memory 1602 may be independently arranged or integrated.

In some embodiments, the communication device 160 may further include a transceiver 1605 and an antenna 1606. The transceiver 1605 may be called a transceiving unit, a transmitter-receiver, a transceiver circuit or the like and is configured to implement a transceiving function. The transceiver 1605 may include a receiver 1608 and a transmitter 1609. The receiver 1608 may be called a receiving machine, a receiving circuit or the like and configured to implement a receiving function. The transmitter 1609 may be called a transmitting machine, a transmission circuit or the like and configured to implement a transmitting function.

In some embodiments, the communication device 160 may further include one or more interface circuits 1607. The interface circuit 1607 is configured to receive a code instruction and transmit the code instruction to the processor 1601. The processor 1601 runs the code instruction so as to cause the communication device 160 to perform any of the methods described in the included method embodiments.

The communication device 160 is a transmitter (such as the transmitter in the included method embodiments). The transceiver 1605 is configured to perform step S21 in FIG. 2; step S31 in FIG. 3; step S51, step S52 and step S53 in FIG. 5; or step S61 and step S63 in FIG. 6; step S71 in FIG. 7; and step S81 in FIG. 8. The processor 1601 is configured to perform step S41 in FIG. 4; step S62 in FIG. 6; step S72 in FIG. 7; and step S82 in FIG. 8.

The communication device 160 is a receiver. The transceiver 1605 is configured to perform step S101 in FIG. 10; step S111 in FIG. 11; step S121, step S122 and step S123 in FIG. 12; step S132 in FIG. 13; and step S141 in FIG. 14. The processor 1601 is configured to perform step S91 in FIG. 9; step S131 in FIG. 13; and step S142 in FIG. 14.

In some embodiments, the processor 1601 may include a transceiver (not shown) configured to implement receiving and transmitting functions. For example, the transceiver may be a transceiver circuit, an interface or an interface circuit. The transceiver circuit, the interface or the interface circuit configured to implement the receiving and transmitting functions may be separated or integrated. The transceiver circuit, interface or interface circuit may be configured to read and write code/data, or the above transceiver circuit, interface or interface circuit may be configured to transmit or transfer a signal.

In some embodiments, the processor 1601 may store a computer program 1603. The computer program 1603 runs on the processor 1601 so as to cause the communication device 160 to perform the method described in the included method embodiments. The computer program 1603 may be firmed in the processor 1601, and in this case, the processor 1601 may be implemented by hardware.

In some embodiments, the communication device 160 may include a circuit either the same as the interface circuit 1607 or a different circuit not shown. The circuit may implement the transmitting, receiving or communication function in the included method embodiments. The processor and the transceiver described in the disclosure may be implemented on an integrated circuit (IC), an analog IC, a radio frequency integrated circuit (RFIC), a mixed signal IC, an application specific integrated circuit (ASIC), a printed circuit board (PCB), an electronic device or the like. The processor and the transceiver may also be manufactured by various IC technologies, for example, a complementary metal oxide semiconductor (CMOS), an nMetal-oxide-semiconductor (NMOS), a positive channel metal oxide semiconductor (PMOS), a bipolar junction transistor (BJT), a bipolar CMOS (BiCMOS), silicon germanium (SiGe), gallium arsenide (GaAs) or the like.

The communication device described in the included embodiments may be the transmitter or the receiver (such as the receiver in the included method embodiments), but a range of the communication device described in the disclosure is not limited to this, and a structure of the communication device may be not limited by FIG. 16. The communication device may be an independent device or a part of a larger device. For example, the communication device may be: (1) an independent integrated circuit (IC), chip, chip system or sub-system; (2) a set with one or more ICs, in some embodiments, the IC set may also include a storage component configured to store data and a computer program; (3) an ASIC, for example, a modem; (4) a module capable of being embedded into another device; (5) a receiving machine, a receiver, a smart receiver, a cell phone, a wireless device, a handset, a mobile unit, a vehicle-mounted device, a transmitter, a cloud device, an artificial intelligence device or the like; and (6) others.

Figure 17:
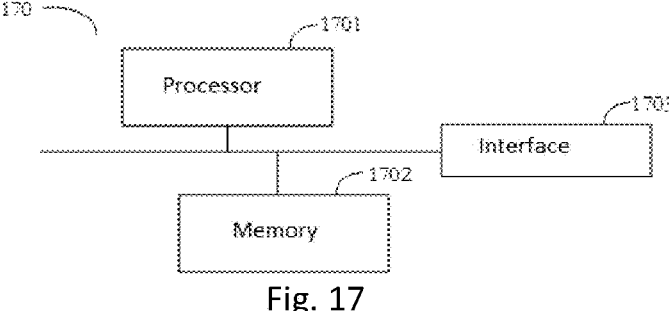
FIG. 17 is a schematic structural diagram of a chip according to an embodiment of the disclosure.

A case where the communication device may be a chip or a chip system may refer to a schematic structural diagram of a chip as shown in FIG. 17. The chip 170 shown in FIG. 17 includes a processor 1701, an interface 1703, and a memory 1702. There may be one or more processors 1701, one or more memories 1702, and a plurality of interfaces 1703.

In a case that the chip 170 is configured to implement the functions of the receiver (such as the receiver in the method embodiments) in the embodiment of the disclosure: the interface 1703 is configured to perform step S101 in FIG. 10; step S111 in FIG. 11; step S121, step S122 and step S123 in FIG. 12; step S132 in FIG. 13; and step S141 in FIG. 14.

In a case that the chip 170 is configured to implement the functions of the transmitter in any of the embodiments of the disclosure: the interface 1703 is configured to perform step S21 in FIG. 2; step S31 in FIG. 3; step S51, step S52 and step S53 in FIG. 5; or step S61 and step S63 in FIG. 6; step S71 in FIG. 7; and step S81 in FIG. 8.

The chip 170 further includes a memory 1702. The memory 1702 is configured to store needed computer program(s) and data.

Those skilled in the art may also know that various illustrative logical blocks and steps listed in the embodiments of the disclosure may be implemented by electronic hardware, computer software or combination of them. Whether such functions are implemented by the hardware or the software depends on a specific application and a design demand of a whole system. Those skilled in the art may use various methods for implementing the functions for each specific application, but such implementation is not construed as being departing from the protection scope of the embodiments of the disclosure.

An embodiment of the disclosure further provides a precoding information feedback system. The precoding information feedback system includes a communication device as a receiver (such as the receiver in the included method embodiments) and a communication device as a transmitter in the embodiment of FIG. 15. Alternatively, the precoding information feedback system includes a communication device as a receiver (such as the receiver in the included method embodiments) and a communication device as a transmitter in the embodiment of FIG. 16.

The disclosure further provides a non-transitory computer readable storage medium, storing an instruction, the instruction, when performed by a computer, implementing functions in any included method embodiments.

The disclosure further provides a computer program product, the computer program product, when run by a computer, implementing functions in any included method embodiments.

The included embodiments may be implemented entirely or partially through software, hardware, firmware or any combination of them. An implementation by the software may be entirely or partially in a form of a computer program product. The computer program product includes one or more computer programs. When the computer programs are loaded and un on the computer, all or part of the flows or functions described in the embodiments of the disclosure are generated. The computer may be a general-purpose computer, a special-purpose computer, a computer network, or other programmable devices. The computer program may be stored in a computer-readable storage medium, or transmitted from one computer-readable storage medium to another computer-readable storage medium. For example, the computer program may be transmitted from one website, computer, server or data center to another website, computer, server or data center in a wired mode (for example, a coaxial cable, an optical fiber, a digital subscriber line (DSL)) or wireless mode (for example, infrared, wireless, microwave or the like). The computer-readable storage medium may be any available medium that the computer can access, or a server, a data center and another data storage device including one or more available media integrated. The available medium may be a magnetic medium (for example, a floppy disk, a hard disk and a magnetic tape), an optical medium (for example, a high-density digital video disc (DVD)), or a semiconductor medium (for example, a solid state disk (SSD)), or the like.

Additional non-limiting embodiments of the disclosure include the following aspects.

A precoding information feedback method, performed by a transmitter and including: obtaining precoding information transmitted by a receiver and determined according to channel state information (CSI).

The method further includes: obtaining a first precoding matrix indicator (PMI) transmitted by the receiver, where the first PMI includes a first-dimension beam indicator and a second-dimension beam indicator in different modals, and the precoding information includes the first PMI.

Obtaining the first precoding matrix indicator (PMI) transmitted by the receiver includes: obtaining indication information transmitted by the receiver, and determining the first PMI according to the indication information.

Obtaining the indication information transmitted by the receiver, and determining the first PMI according to the indication information includes: obtaining a first intra-group offset of a first-dimension indicator sub-group where the receiver is located and a second intra-group offset of a second-dimension indicator sub-group where the receiver is located that are in different modals and transmitted by the receiver, where the indication information includes the first intra-group offset and the second intra-group offset in different modals; determining a first-dimension beam indicator in any modal according to the first intra-group offset in any modal; and determining a second-dimension beam indicator in any modal according to the second intra-group offset in any modal.

The method further includes: obtaining a first group offset of the first-dimension indicator sub-group where the receiver is located and a second group offset of the second-dimension indicator sub-group where the receiver is located that are in different modals and transmitted by the receiver, the indication information further including the first group offset and the second group offset; determining a first-dimension beam indicator in any modal according to the first group offset and the first intra-group offset in any modal; and determining a second-dimension beam indicator in any modal according to the second group offset and the second intra-group offset in any modal.

The method further includes: receiving independent indication information for each of the first intra-group offset, the second intra-group offset, the first group offset and the second group offset; or receiving joint indication information carrying the first intra-group offset, the second intra-group offset, the first group offset and the second group offset.

The method further includes: obtaining a maximum number of modals of an orbital angular momentum (OAM) that can be used for transmitting under a current channel condition and transmitted by the receiver, where the precoding information includes the number of modals of the OAM.

The method further includes: obtaining a first indicator number, transmitted by the receiver, of a first modal combination selected for transmission, where the precoding information includes the first indicator number.

The method further includes: determining at least one of a second modal combination or a second PMI selected by the transmitter; and indicating a second indicator number of the second modal combination to the receiver.

The method further includes: determining a first-dimension beamforming vector and a second-dimension beamforming vector of an OAM beam in different modals according to a target PMI selected finally, where the target PMI is the first PMI or a second PMI.

The method further includes: determining OAM modals in a modal combination selected finally, a number of logical antenna arrays of the transmitter and an oversampling factor; determining a first-dimension beamforming vector of an OAM beam in any modal according to any modal, the number of logical antenna arrays, the oversampling factor and a first-dimension beam indicator in any modal included in the target PMI; and determining a second-dimension beamforming vector of the OAM beam in any modal according to any modal, the number of logical antenna arrays, the oversampling factor and a second-dimension beam indicator in any modal included in the target PMI.

The method further includes: transmitting a reference signal to the receiver before obtaining the precoding information transmitted by the receiver and determined according to the channel state information (CSI), the reference signal being used for performing channel estimation by the receiver.

A precoding information feedback method, performed by a receiver and including: determining precoding information according to channel state information (CSI), and transmitting the precoding information to a transmitter.

The method further includes: transmitting a first precoding matrix indicator (PMI) to the transmitter, where the first PMI includes a first-dimension beam indicator and a second-dimension beam indicator in different modals, and the precoding information includes the first PMI.

Transmitting the first precoding matrix indicator (PMI) to the transmitter includes: transmitting indication information to the transmitter, the indication information being used for determining the first PMI.

Transmitting the indication information to the transmitter, the indication information being used for determining the first PMI, includes: transmitting to the transmitter a first intra-group offset of a first-dimension indicator sub-group where the receiver is located and a second intra-group offset of a second-dimension indicator sub-group where the receiver is located that are in different modals, where the indication information includes the first intra-group offset and the second intra-group offset in different modals, the first intra-group offset in any modal is used for determining a first-dimension beam indicator in any modal, and the second intra-group offset in any modal is used for determining a second-dimension beam indicator in any modal.

The method further includes: transmitting to the transmitter a first group offset of the first-dimension indicator sub-group where the receiver is located and a second group offset of the second-dimension indicator sub-group where the receiver is located that are in different modals, where the indication information further includes the first group offset and the second group offset, the first group offset and the first intra-group offset in any modal are used for determining a first-dimension beam indicator in any modal, and the second group offset and the second intra-group offset in any modal are used for determining a second-dimension beam indicator in any modal.

The method further includes: transmitting indication information for each of the first intra-group offset, the second intra-group offset, the first group offset and the second group offset to the transmitter; or transmitting joint indication information carrying the first intra-group offset, the second intra-group offset, the first group offset and the second group offset to the transmitter.

The method further includes: transmitting to the transmitter a maximum number of modals of an orbital angular momentum (OAM) that can be used for transmitting under a current channel condition, where the precoding information includes the number of modals of the OAM.

The method further includes: transmitting to the transmitter a first indicator number of a first modal combination selected for transmission, where the precoding information includes the first indicator number.

The method further includes: receiving a modal-combination indicator indication transmitted by the transmitter, where the modal-combination indicator indication is used for indicating a second indicator number of a second modal combination selected by the transmitter.

Determining the precoding information according to the channel state information (CSI) includes: determining an optimal precoding vector and an optimal modal combination according to the CSI; and determining the precoding information according to the optimal precoding vector and the optimal modal combination.

Before determining the precoding information according to the channel state information (CSI), the method further includes: receiving a reference signal transmitted by the transmitter, and obtaining the CSI by performing channel estimation according to the reference signal.

A communication device, the communication device having a part of or all functions of a transmitter for implementing the method in the first aspect. For example, the communication device may have functions in a part of or all embodiments in the disclosure, or may have a function for independently implementing any embodiment of the disclosure. The functions may be implemented through hardware or by executing corresponding software in hardware. The hardware or software includes one or more units or modules corresponding to the included functions.

A structure of the communication device may include a transceiving module and a processing module. The processing module is configured to support the communication device to perform the corresponding functions in the included methods. The transceiving module is configured to support the communication device to communicate with other devices. The communication device may also include a storage module. The storage module is configured to be coupled with the transceiving module and the processing module and to store a computer program and data needed by the communication device.

The processing module may be a processor. The transceiving module may be a transceiver or a communication interface. The storage module may be a memory.

A communication device, the communication device having a part of or all functions of a receiver for implementing the method embodiments in the second aspect. For example, the communication device may have functions in a part of or all embodiments in the disclosure, or may have a function for independently implementing any embodiment of the disclosure. The functions may be implemented through hardware or by executing corresponding software in hardware. The hardware or software includes one or more units or modules corresponding to the included functions.

A structure of the communication device may include a transceiving module and a processing module. The processing module is configured to support the communication device to perform the corresponding functions in the included methods. The transceiving module is configured to support the communication device to communicate with other devices. The communication device may also include a storage module. The storage module is configured to be coupled with the transceiving module and the processing module and to store a computer program and data needed by the communication device.

The processing module may be a processor, the transceiving module may be a transceiver or a communication interface, and the storage module may be a memory.

A communication device, including a processor. The processor, when calling a computer program in a memory, performs the method in the first aspect.

A communication device, including a processor. The processor, when calling a computer program in a memory, performs the method in the second aspect.

A communication device, including a processor and a memory. The memory stores a computer program. The processor executes the computer program stored in the memory so as to cause the communication device to perform the method in the first aspect.

A communication device, including a processor and a memory. The memory stores a computer program. The processor executes the computer program stored in the memory so as to cause the communication device to perform the method in the second aspect.

A communication device, including a processor and an interface circuit. The interface circuit is configured to receive a code instruction and transmit the code instruction to the processor. The processor is configured to run the code instruction so as to cause the device to perform the method in the first aspect.

A communication device, including a processor and an interface circuit. The interface circuit is configured to receive a code instruction and transmit the code instruction to the processor. The processor is configured to run the code instruction so as to cause the device to perform the method in the second aspect.

A precoding information feedback system, including the communication device in the third aspect and the communication device in the fourth aspect, or including the communication device in the fifth aspect and the communication device in the sixth aspect, or including the communication device in the seventh aspect and the communication device in the eighth aspect, or including the communication device in the ninth aspect and the communication device in the tenth aspect.

A non-transitory computer-readable storage medium, configured to store an instruction used for the receiver, the instruction, when executed, causing the receiver to perform the method in the second aspect.

A non-transitory computer-readable storage medium, configured to store an instruction used for the transmitter, the instruction, when performed, causing the transmitter to perform the method in the first aspect.

A computer program product including a computer program, the computer program product, when running on a computer, causing the computer to perform the method in the first aspect.

A computer program product including a computer program, the computer program product, when running on a computer, causing the computer to perform the method in the second aspect.

A chip system, including at least one processor and an interface and configured to support a receiver to implement the functions involved in the second aspect, for example, determining or processing at least one type of data and information involved in the included methods. In some embodiments, the chip system further includes a memory, the memory being configured to store a computer program and data needed by the receiver. The chip system may be composed of chips, or may also include a chip and other discrete devices.

A chip system, including at least one processor and an interface and configured to support a transmitter to implement the functions involved in the first aspect, for example, determining or processing at least one type of data and information involved in the included methods. In some embodiments, the chip system further includes a memory, the memory being configured to store a computer program and data needed by the transmitter. The chip system may be composed of chips, or may also include a chip and other discrete devices.

A computer program, the computer program, when running on a computer, causing the computer to perform the method in the first aspect.

A computer program, the computer program, when running on a computer, causing the computer to perform the method in the second aspect.

Those ordinarily skilled in the art may know that various ordinal numerals such as first and second involved in the disclosure are distinguished for convenient description but are not used for limiting the scope of the embodiments of the disclosure and also represent a sequential order.

The wording "at least one" in the disclosure may be described as one or a plurality. The wording "a plurality" may be two, three, four or more, which is not limited in the disclosure. In the embodiments of the disclosure, as for a technical feature, technical features on this technical feature are distinguished through "first", "second", "third", "A", "B", "C", "D" and the like, and there is no sequential order or magnitude sequence between the technical features described by "first", "second", "third", "A", "B", "C" and "D".

A corresponding relationship shown in each table in the disclosure may be configured or pre-defined. Values of information in each table are merely embodiments and may be set as other values, which is not limited in the disclosure. When configuring the relationships between the information and the various parameters, not all the relationships shown in each table are necessarily configured. For example, in the tables in the disclosure, the corresponding relationships shown in some rows may also not be configured. For another example, a proper variation may be made based on the included tables, for example, splitting, merging and the like. Names of parameters shown in titles in each table may also use other names comprehensible for the communication device, values or representation forms of the parameters may also be other values or representation forms comprehensible for the communication device. In an implementation of each included tables, other data structures may also be used. For example, an array, a queue, a container, a stack, a linear table, a pointer, a chain table, a tree, a graph, a structural body, a class, a heap, a hash table, or the like may be used.

The wording "pre-defining" in the disclosure may be understood as defining, pre-defining, storage, pre-storage, pre-consulting, pre-configuration, firming or pre-flash.

Those ordinarily skilled in the art may realize that units and algorithm steps of the various embodiments described with reference to the embodiments disclosed here can be implemented by electronic hardware or combining computer software and the electronic hardware. Whether these functions are performed in a form of hardware or a form of software depends on particular applications and design constraint conditions of the technical solutions. Professional and technical staff may use different methods for implementing the described functions for each particular application, but this implementation is not to be regarded as departing from the scope of the disclosure.

Those skilled in the art may clearly know that for a convenient and concise description, specific working processes of the included described systems, devices and units may refer to corresponding processes in the included method embodiments, which is not repeated here.

The examples included are embodiments of the disclosure, but the protection scope of the disclosure is not limited to this. Any of those skilled in the art can easily figure out variations or replacements within the technical scope disclosed by the disclosure, and the variations and the replacements are supposed to be covered within the protection scope of the disclosure. Thus, the protection scope of the disclosure is supposed to be subject to the protection scope of the claims.

The invention claimed is:

1. A precoding information feedback method, performed by a transmitter and comprising:

obtaining precoding information transmitted by a receiver and determined according to channel state information (CSI); and obtaining a first precoding matrix indicator (PMI) transmitted by the receiver, wherein the first PMI comprises a first-dimension beam indicator and a second-dimension beam indicator in different modals, and the precoding information comprises the first PMI.

2. The method according to claim 1, wherein obtaining the first PMI transmitted by the receiver comprises:

obtaining indication information transmitted by the receiver, and determining the first PMI according to the indication information.

3. The method according to claim 2, wherein obtaining the indication information transmitted by the receiver, and determining the first PMI according to the indication information comprises:

obtaining a first intra-group offset of a first-dimension indicator sub-group where the receiver is located and a second intra-group offset of a second-dimension indicator sub-group where the receiver is located that are in different modals and transmitted by the receiver, wherein the indication information comprises the first intra-group offset and the second intra-group offset in different modals;

determining the first-dimension beam indicator in any modal according to the first intra-group offset in any modal; and determining the second-dimension beam indicator in any modal according to the second intra-group offset in any modal.

4. The method according to claim 3, further comprising:

obtaining a first group offset of the first-dimension indicator sub-group where the receiver is located and a second group offset of the second-dimension indicator sub-group where the receiver is located that are in different modals and transmitted by the receiver, the indication information further comprising the first group offset and the second group offset;

determining the first-dimension beam indicator in any modal according to the first group offset and the first intra-group offset in any modal; and determining the second-dimension beam indicator in any modal according to the second group offset and the second intra-group offset in any modal.

5. The method according to claim 4, further comprising:

receiving independent indication information of each of the first intra-group offset, the second intra-group offset, the first group offset and the second group offset; or receiving joint indication information carrying the first intra-group offset, the second intra-group offset, the first group offset and the second group offset.

6. The method according to claim 1, further comprising at least one of:

obtaining a maximum number of modals of an orbital angular momentum (OAM) that can be used for transmitting under a current channel condition and transmitted by the receiver, wherein the precoding information comprises the number of modals of the OAM;

obtaining a first indicator number, transmitted by the receiver, of a first modal combination selected for transmission, wherein the precoding information comprises the first indicator number;

determining at least one of a second modal combination or a second PMI selected by the transmitter, and indicating a second indicator number of the second modal combination to the receiver;

determining a first-dimension beamforming vector and a second-dimension beamforming vector of an OAM beam in different modals according to a target PMI selected finally, wherein the target PMI is the first PMI or the second PMI;

determining an OAM modal in a modal combination selected finally, a number of logical antenna arrays of the transmitter and an oversampling factor, determining the first-dimension beamforming vector of the OAM beam in any modal according to any of the modals, the number of logical antenna arrays, the oversampling factor and a first-dimension beam indicator in any modal comprised in the target PMI, and determining the second-dimension beamforming vector of the OAM beam in any modal according to any of the modals, the number of logical antenna arrays, the oversampling factor and a second-dimension beam indicator in any modal comprised in the target PMI; or transmitting a reference signal to the receiver before obtaining the precoding information transmitted by the receiver and determined according to the channel state information (CSI), the reference signal being used for performing channel estimation by the receiver.

7. A precoding information feedback method, performed by a receiver and comprising:

determining precoding information according to channel state information (CSI), and transmitting the precoding information to a transmitter; and transmitting a first precoding matrix indicator (PMI) to the transmitter, wherein the first PMI comprises a first-dimension beam indicator and a second-dimension beam indicator in different modals, and the precoding information comprises the first PMI.

8. The method according to claim 3, wherein transmitting the first PMI to the transmitter comprises:

transmitting indication information to the transmitter, the indication information being used for determining the first PMI.

9. The method according to claim 8, wherein transmitting the indication information to the transmitter, the indication information being used for determining the first PMI, comprises:

transmitting to the transmitter a first intra-group offset of a first-dimension indicator sub-group where the receiver is located and a second intra-group offset of a second-dimension indicator sub-group where the receiver is located that are in different modals, wherein the indication information comprises the first intra-group offset and the second intra-group offset in different modals, the first intra-group offset in any modal is used for determining the first-dimension beam indicator in any modal, and the second intra-group offset in any modal is used for determining the second-dimension beam indicator in any modal.

10. The method according to claim 9, further comprising:

transmitting to the transmitter a first group offset of the first-dimension indicator sub-group where the receiver is located and a second group offset of the second-dimension indicator sub-group where the receiver is located that are in different modals, wherein the indication information further comprises the first group offset and the second group offset, the first group offset and the first intra-group offset in any modal are used for determining the first-dimension beam indicator in any modal, and the second group offset and the second intra-group offset in any modal are used for determining the second-dimension beam indicator in any modal.

11. The method according to claim 10, further comprising:

transmitting to the transmitter indication information of each of the first intra-group offset, the second intra-group offset, the first group offset and the second group offset; or transmitting to the transmitter joint indication information carrying the first intra-group offset, the second intra-group offset, the first group offset and the second group offset.

12. The method according to claim 7, further comprising at least one of:

transmitting to the transmitter a maximum number of modals of an orbital angular momentum (OAM) that can be used for transmitting under a current channel condition, wherein the precoding information comprises the number of modals of the OAM;

transmitting to the transmitter a first indicator number of a first modal combination selected for transmission, wherein the precoding information comprises the first indicator number; or receiving a modal combination indicator indication transmitted by the transmitter, wherein the modal combination indicator indication is used for indicating a second indicator number of a second modal combination selected by the transmitter.

13. The method according to claim 7, wherein determining the precoding information according to the CSI comprises:

determining an optimal precoding vector and an optimal modal combination according to the CSI; and determining the precoding information according to the optimal precoding vector and the optimal modal combination.

14. The method according to claim 7, wherein before determining the precoding information according to the CSI, the method further comprises:

receiving a reference signal transmitted by the transmitter, and obtaining the CSI by performing channel estimation according to the reference signal.

15. A communication device, comprising a processor and a memory, the memory storing a computer program, and the processor executing the computer program stored in the memory so as to cause the communication device to:

obtain precoding information transmitted by a receiver and determined according to channel state information (CSI); and obtain a first precoding matrix indicator (PMI) transmitted by the receiver, wherein the first PMI comprises a first-dimension beam indicator and a second-dimension beam indicator in different modals, and the precoding information comprises the first PMI.

16. A communication device, comprising a processor and a memory, the memory storing a computer program, and the processor executing the computer program stored in the memory so as to cause the communication device to perform the method according to claim 7.

17. A communication device, comprising: a processor and an interface circuit;

the interface circuit being configured to receive a code instruction and transmit the code instruction to the processor; and the processor being configured to run the code instruction so as to perform the method according to claim 1.

18. A communication device, comprising: a processor and an interface circuit;

the interface circuit being configured to receive a code instruction and transmit the code instruction to the processor; and the processor being configured to run the code instruction so as to perform the method according to claim 7.

* * * * *